Patented May 23, 1950

2,508,602

UNITED STATES PATENT OFFICE 2,508,602

POROUS FILTER POWDER

Alexander Goetz, Pasadena, Calif., assignor to Sunshine Mining Company, Yakima, Wash., a corporation No Drawing. Application September 9, 1943, Serial No. 501,684

3 Claims. (Cl. 210—203)

My invention relates to improvements in filters and filtering materials and methods of producing and using the same. My invention more particularly relates to filters and filtering materials for filtration of water and other liquids.

My invention still more particularly relates to the practical art of filtration of water, beers, wines and other aqueous liquids employing filtering equipment comprising a foraminous metal screen, or a screen of porous ceramic material, carbon, textile fabric, and the like, and a layer deposit of powdery filter material, usually of a siliceous nature, more particularly diatomaceous earth, bentonites and the like, on the upstream side of the screen.

The hereinafter stated principles and examples of the practice of my invention are not restricted to the use of diatomaceous earth but are also applicable to other powdery filter materials, including certain bentonites, suitable for use in the filtration of water and other liquids; and my invention is therefore to be understood as including such other materials as well as diatomaceous earth. However, since diatomaceous earth is broadly representative of such other filter materials while at the same time presenting certain specific characteristics rendering its use particularly advantageous in my invention, for brevity the following descriptions of my invention will be confined to the use of diatomaceous earth as the filter powder.

It is of the utmost importance to produce a filter powder composed of diatomaceous earth, bentonite or the like, which, until intentionally washed off the screen, will permanently adhere to the upstream face of the screen and form a mechanically coherent filter unit of substantially unchanging uniform composition throughout all its parts, and yet without appreciable impairment of the original porosity and filtration properties of those materials. My invention is directed to the production of such filter powder.

Broadly or generally considered, my invention comprises so treating a quantity of diatomaceous earth, bentonite or the like with a plastic either dissolved in a suitable solvent or in a still fluent incompletely polymerized state, as to cause each individual particle of the material, such as diatomaceous earth, for example, to be uniformly coated with an extremely thin and firmly adhering layer of the plastic, avoiding, however, adherence of the plastic-coated particles to each other in the finished product and with the resulting particles forming, in the mass, a powder of substantially the fineness of the diatomaceous earth before the treatment.

The plastic intended by my invention for such treatment of the diatomaceous earth is one which is water-insoluble but susceptible to water in the sense of having the property, when brought in contact with water, of absorbing water and swelling to larger body volume by such absorption. The required quantity of the powder, composed of the plastic-coated individual particles or diatoms of the diatomaceous earth, may be deposited on the upstream face of the screen, before substantial swelling of the plastic coatings occurs, by the same procedure employed in the known practical art of water filtration for the formation of the powder layer or cake of diatomaceous earth.

The plastic coatings on the individual diatoms deposited on the screen very soon begin to swell, however, as the water flow is continued, resulting in an interlocking of the coated particles with each other and with the surface irregularities of the screen and the formation of a coherent film of the plastic-coated diatoms which requires an appreciable back pressure of the water for its removal from the screen. Thus, the danger of an unintended or accidental sluffing off of the filter cake is avoided.

There are a number of plastics having the above stated property of water susceptibility without being water soluble, and which are suitable for the above-stated use. As examples, I may employ any one of a number of copolymers of vinyl derivatives rich in acetate or any one of a number of cellulose esters. When employing one of the copolymers of vinyl derivatives, I preferably employ one having approximately 85% vinyl acetate and 15% vinyl chloride. When employing a cellulose ester, I preferably employ one of the cellulose acetates or a mixture of cellulose acetates. I may, although somewhat less advantageously, employ a vinyl acetate alone for the water-insoluble but water susceptible plastic.

The required quantity of diatomaceous earth may be subject to any one of several different procedures for the coating of the individual diatoms of that material with a plastic of the nature stated above. I preferably employ the following procedure.

A mass of the diatoms is saturated with a liquid which should be either a solvent for the plastic or compatible with the solvent to be used with the plastic.

A liquid, such as dichlorethane, for example, capable of functioning as a solvent for the plastic or at least compatible with such other solvent as may be selected for the plastic, is gradually added to the diatomaceous earth in a suitable container until the mass of diatoms has fully reached its saturation point or capacity, and none of the liquid is left over as a supernatant in the container. The mass of diatoms in that saturation state is a non-fluent mass in the form of a soft cake. The plastic, in the required quantity, and either in partially or completely polymerized form, is dissolved separately in dichlorethane or in some other selected solvent compatible with dichlorethane, such as methyl or dimethylbenzene, or a cyclic ketone or mixtures of those or similar solvents. The previously saturated mass of diatoms and the solution of the plastic are then intimately mixed mechanically, resulting in an intimate combination of the diatoms and the plastic, with the latter as a film-like coating over each diatom. This coating is a thin surface film without substantial penetration into the pores of the diatoms due to the saturation state of that material previously accomplished.

The material (the mass of diatoms with the plastic in solution as a thin surface film on each diatom) is then subjected to mild heat or a vacuum drying procedure to drive off the solvent. Thus there is produced, as the finished product, a fine powder mass of diatoms each coated with an exceedingly thin film of the plastic, and with that powder ready for its beforementioned use as a filter powder firmly adhering to the screen of the filtering unit, by reason of the swelling of the plastic coating when in contact with the water undergoing filtration.

It may be further noted, however, that the plastic-coated diatoms are not readily wetted by the water until some time has elapsed after their being placed therein and hence will not at first sink below the surface of the water flowing to the screen, as is necessary for their initial deposition on the upstream face of the screen. That delay in the formation of the powdery layer or cake of the plastic-coated diatoms on the screen may be avoided, however, by treating the mass of plastic-coated diatoms with any of the numerous well-known wetting agents, such as certain sulfonated hydrocarbon derivatives, of which the group of wetting agents known under the trade name "Aquaphor" is typical.

As hereinbefore stated, the layer or cake of diatomaceous filter powder firmly adheres to the filter screen by reason of the water-absorbed and swollen condition of that plastic coating on the particles of that powder which interlocks the particles together and to the screen. Then, the operation of that filter powder or cake is entirely mechanical, the suspended particles in the water being held back mechanically as separate particles of matter on the filter cake on the upstream side of the screen.

In some filtering operations, it is desirable, however, to supplement the above-mentioned purely mechanical action of such filtration powders by agents effective in the removal of extremely fine suspended colloidal matter from the water by the well-known process of coagulation. To that end, my invention also comprises the incorporation of such an agent in an extremely finely divided form into the plastic prior to its application to the diatoms. In this way, the coagulant acts upon the suspended matter in the water simultaneously with the mechanical retention of that matter on the filter cake.

Such coagulating agent may be any one of the hydroxides or sulfates of Al and Fe ions, of which alum and iron hydroxide are typical examples. For the incorporation of the coagulant in the plastic coating which is to be formed on each diatom, a small quantity of the selected coagulant, in minutely fine subdivision, may be mechanically mixed with the solution of the plastic before the latter is mixed with the mass of diatoms, the procedure in the formation of the coating being otherwise as before described, and the result being an incorporation of the coagulant, such as finely divided alum, for example, into the plastic coating on each diatom.

It is also highly desirable in some cases, particularly in the filtration of water for drinking purposes, to have the filter function not only in the filtration but also in the sterilization of the water. To that end, my invention further comprises the incorporation of a water-insoluble germicidal composition as a colloidal suspension in the plastic prior to coating the diatoms with the plastic. To that end, my present invention preferably employs a germicidal composite powder of colloidal carbon and silver with the latter in an adsorbed and activating oxygenated state on the carbon as described and claimed in my copending application Serial No. 469,578, filed December 19, 1942, which has become abandoned. It has been found advantageous in improving the germicidal action of the just mentioned germicidal compositions of colloidal carbon and silver to incorporate together with such composition a basic heavy metal oxide, such as zinc oxide, titanium oxide and the like, in a state of extremely fine subdivisions into the plastic. The incorporation of the germicidal carbon-silver colloid and the finely divided metal oxide into the plastic coating on the diatoms may be attained by the same procedure mentioned above for incorporation of the coagulants into the plastic.

In the practical application of such germicidally active powders for water sanitation, the method of powder filtration as commonly practiced involves an inherent handicap caused by the possibility of an infection or bacterial contamination of the down-stream parts of the filter by the initial water flow which has passed through the screen before an adequate filter cake of the plastic coated diatoms containing the above-mentioned germicidal composition in the plastic has formed on the upstream face of the screen, and also by the residual bacterial contamination on the downstream side of the filter unit. That danger can successfully be avoided, however, in my invention by the addition of a water-soluble disinfecting agent to the filter powder in a quantity sufficient for accomplishing the initial disinfection of the involved parts of the downstream side of the filter. Because of its water solubility, this disinfecting agent is leached out of the filter powder immediately upon contact of that powder with the water and thus the disinfecting agent is carried initially through all parts of the filter.

It is important, however, that the water-soluble disinfecting agent shall not react adversely with the water-insoluble germicidal composition contained as above described in the plastic coatings on the diatoms. In fact, it is highly advantageous to use as the water-soluble disinfectant one which reacts favorably with the water-insoluble germicidal composition in the plastic coatings on the diatoms. The above-mentioned colloidal carbon-silver germicidal composition preferably employed in the plastic coatings on the diatoms comprises a surface compound of silver and oxygen on the carbon, and it is well known that silver-oxygen compounds act catalytically upon hydrogen peroxide. Also, experiments have shown that a very much smaller quantity of hydrogen peroxide can be used in the presence of such a silver-oxygen compound in order to impart the required germicidal properties to the water than would be required without the presence of the silver-oxygen compound.

Another advantage of the choice of hydrogen peroxide for the above-mentioned specific purpose is its relatively short life as hydrogen peroxide in water. Whereas that is a handicap for general use of hydrogen peroxide in water sanitation, it is an advantage for its above-stated specific use which requires its disinfecting action only in the very initial stages of the filtration before the layer or cake of the diatoms having the water-insoluble germicidal composition in their plastic coatings has had time to completely form on the screen. After that cake has formed on the upstream face of the screen, the hydrogen peroxide is no longer needed and should disappear as soon as possible in order to avoid imparting an unpleasant taste to the filtrate.

Because of the very nature of the intended application of the water-soluble disinfectant, that is, as an admixture to the dry filtration powder prior to use, it is necessary, however, that the hydrogen peroxide be added in the form of a solid powder to the filter powder. It is, therefore, evident that hydrogen peroxide as such cannot be used and that, instead, a solid material yielding hydrogen peroxide upon contact with water should be used. Urea peroxide is such a water-soluble solid substance yielding the peroxide upon contact with water; and my invention comprises its use for the above-stated purpose. For such use the urea peroxide is pulverized and mechanically mixed with the dry powder of plastic-coated diatoms.

I claim:

1. A porous filter powder comprising diatoms and a plastic coating on each individual diatom, said plastic of said coating being one of the copolymers of vinyl derivatives having approximately 85% vinyl acetate and approximately 15% vinyl chloride in its composition and having the property of absorbing water and swelling to increased volume of said coating upon said absorption.

2. A porous filter powder as recited in claim 1 and a germicidal composition composed of colloidal carbon and silver in an oxygenated state carried on said carbon, said germicidal composition being embedded in said plastic coating.

3. A substantially dry filter powder comprising a porous mass of fine granular particles of a water-insoluble solid material adapted for the filtration of aqueous liquids, each particle of said mass having a coating of a water-insoluble plastic having the property of absorbing water and swelling to substantially larger body volume by such absorption, said plastic being one of the copolymers of vinyl derivatives rich in acetate.

ALEXANDER GOETZ.

REFERENCES CITED

The following references are of record in the file of this patent:

UNITED STATES PATENTS

| Number | Name | Date |
|---|---|---|
| 589,638 | Busch et al. | Sept. 7, 1897 |
| 1,078,918 | Gruter | Nov. 18, 1913 |
| 1,473,331 | Bechhold | Nov. 6, 1923 |
| 1,557,235 | Bechhold | Oct. 13, 1925 |
| 1,576,440 | Martin | Mar. 9, 1926 |
| 1,579,171 | Zoul | Mar. 30, 1926 |
| 1,777,546 | Blumenberg | Oct. 7, 1930 |
| 1,935,577 | Reid | Nov. 14, 1933 |
| 1,981,877 | Pierce | Nov. 27, 1934 |
| 2,040,818 | Badollet | May 19, 1936 |
| 2,066,271 | Irwin | Dec. 29, 1936 |
| 2,106,318 | Elliott et al. | Jan. 25, 1938 |
| 2,167,225 | Van Eweyk | July 25, 1939 |
| 2,195,196 | Wassenegger | Mar. 26, 1940 |
| 2,198,378 | Ellis | Apr. 23, 1940 |
| 2,219,581 | Schmidt | Oct. 29, 1940 |
| 2,232,153 | Vohrer | Feb. 18, 1941 |
| 2,243,826 | Nielsen et al. | May 27, 1941 |
| 2,315,410 | Simons et al | Mar. 30, 1943 |
| 2,327,250 | Cruickshank | Aug. 17, 1943 |
| 2,328,361 | Sanders | Aug. 31, 1943 |
| 2,340,110 | D'Alelio | Jan. 25, 1944 |
| 2,340,111 | D'Alelio | Jan. 25, 1944 |
| 2,355,822 | Rugeley | Aug. 15, 1944 |

FOREIGN PATENTS

| Number | Country | Date |
|---|---|---|
| 427,199 | Great Britain | Apr. 17, 1935 |

OTHER REFERENCES

Handbook of Chemistry and Physics, 27th edition, page 1231, 1943.